US008750161B1

(12) United States Patent
Matthews et al.

(10) Patent No.: US 8,750,161 B1
(45) Date of Patent: Jun. 10, 2014

(54) METROPOLITAN IP AGGREGATION NETWORK DESIGN TOOL

(75) Inventors: David Matthews, Algonquin, IL (US);
Promod Kumar Bhagat, Morganville, NJ (US); Robert Duncan Doverspike, Tinton Falls, NJ (US); John Gregory Klincewicz, Ocean, NJ (US); Jian Li, San Ramon, CA (US); Guangzhi Li, Madison, NJ (US); David Frederick Lynch, Freehold, NJ (US); Moshe Segal, Tinton Falls, NJ (US); Dongmei Wang, Madison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 628 days.

(21) Appl. No.: 12/972,651

(22) Filed: Dec. 20, 2010

(51) Int. Cl.
*H04L 12/28* (2006.01)

(52) U.S. Cl.
USPC ............................ 370/254; 370/351; 709/241

(58) Field of Classification Search
USPC ......... 370/238, 386, 254–256, 328, 338, 351, 370/352; 709/221, 241
See application file for complete search history.

(56) References Cited

PUBLICATIONS

M. Cha et al., Case Study: Resilient Backbone Design for IPTV Services, IPTV Workshop, International World Wide Web Conference (Edinburgh 2006).
S. Lin and J. H. Rath, "Designing Networks for AT&T's Customers," AT&T Technology, vol. 2, No. 2, pp. 18-25, 1987.
G. L. Choudhury and J. G. Klincewicz, "Survivable IP Link Topology Design in an IP-over-WDM Architecture," Seventh International Workshop on the Design of Reliable Communication Networks, Washington, DC, Oct. 26-29, 2009.
J. G. Klincewicz, "Issues in Link Topology Design for IP Networks," in: Proceedings of Performance, Quality of Service and Control of Next-Generation Communication and Sensor Networks III, M. Atiquzzaman, Sergey I. Balandin (editors), SPIE vol. 6011, Oct. 24-25, 2005.
J. G. Klincewicz, "Why is IP Network Design So Difficult?" Eighth INFORMS Telecommunications Conference, Dallas, TX, Mar. 30-Apr. 1, 2006.
A. Bley, M. Grotschel and R. Wessally, "Design of Broadband Virtual Private Networks: Model and Heuristics for the B-WiN," in: Robust Communication Networks: Interconnection and Survivability, DIMACS Series in Discrete Mathematics and Theoretical Computer Science, vol. 53, pp. 1-16, N. Dean, D. F. Hsu and R. Ravi (editors), American Mathematical Society, New Providence, RI, 1998.
J. G. Klincewicz, J. A. Schmitt and R. T. Wong, "Incorporating QoS into IP Enterprise Network Design," Telecommunications Systems, vol. 20, pp. 411-433, 2002.
L.S. Buriol, M.G.C. Resende, and M. Thorup, "Survivable IP Network Design with OSPF Routing," Networks, vol. 49, pp. 51-64, 2007.

(Continued)

*Primary Examiner* — Dang Ton
*Assistant Examiner* — Mandish Randhawa (57) ABSTRACT

In a tool for use by network planners in designing metropolitan IP aggregation networks, several optimization methods are integrated into a tool. A k-means algorithm is used to choose access packet switch locations. A dual-k-means algorithm is used to choose the backbone switch locations. Each access packet switch is dual homed to two backbone packet switches using two diverse paths. The diverse path configuration is found using a maxflow-mincost algorithm on a modified fiber map topology. The link topology connecting the backbone packet switches to each other is designed using a heuristic that creates a skeleton network topology and then adds express links one by one, testing each link to assure reduced overall network cost. The resulting network topology is then improved upon by local search.

20 Claims, 6 Drawing Sheets

(56) References Cited

PUBLICATIONS

D. V. Andrade, L. S. Buriol, M. G. C. Resende and M. Thorup, "Survivable Composite-link IP Network Design with OSPF Routing," Eighth INFORMS Telecommunications Conference, Dallas, Texas, Apr. 2006.

K. Holmberg and D. Yuan, "Optimization of Internet Protocol Network Design and Routing," Networks vol. 43, No. 1, pp. 39-53, 2004.

S. Borne, E. Gourdin, B. Liau, A. R. Mahjoub, "Design of Survivable IP-over-optical networks," Annals of Operations Research, vol. 146, pp. 41-73, 2006.

G. L. Choudhury, "Models for IP|MPLS Routing Performance: Convergence, Fast Reroute and QoS Impact," Keynote Address, Proceedings of ITCOM Conference on Performance, QoS and Control of Next-Generation Communication Networks, SPIE vol. 5598, Philadelphia, PA, Oct. 25, 2004, pp. I-12.

Kompella K, Rekhter Y (2007) IETF RFC 4761, "Virtual private LAN service (VPLS) using BGP for auto-discovery and signaling," http://tools.ietf.org/html/rfc4761.

Lasserre M, Kompella V (2007) IETF RFC 4762, "Virtual private LAN service (VPLS) using label distribution protocol (LDP) signaling," http://tools.ietf.org/html/rfc4762.

Wall Street Journal, "AT&T Details Plans for Upgrading Network," Jan. 29, 2010.

Robert S. Cahn, "Wide Area Network Design: Concepts and Tools for Optimization," pp. 256-259, Morgan Kaufmann Publishers, 1998.

R. Ahuja., T. Magnanti, and J. Orlin, "Network Flows," pp. 317-319, Prentice-Hall, 1993.

G. Li, R. R Doverspike, and C. Kalmanek, "Fiber Span Failure Protection in Mesh Optical Networks," Optical Networks Magazine, pp. 21-31, vol. 3, (3), May/Jun. 2002.

C. Li, S. S McCormick, and D. Simchi-Levi, "The Complexity of Finding Two Disjoint Paths with Min-Max Objective Function," Discrete Applied Mathematics, pp. 105-115, vol. 26, (1), Jan. 1990.

J.W. Suurballe, "Disjoint paths in a network," Networks, vol. 4 (2), pp. 125-145, 1974.

METROPOLITAN IP AGGREGATION NETWORK DESIGN TOOL

FIELD OF THE DISCLOSURE

The present disclosure relates generally to the design of communications networks, and more particularly, to tools for designing an aggregation network including both network access packet switches and network backbone packet switches.

BACKGROUND

New IP aggregation ("IPAG") networks use a layered architecture, including OSI Layer-2 (L2) aggregation or access packet switches, connected by physically diverse fiber paths to a "cluster" of IPAG core network backbone packet switches. Layer-2 is a protocol layer in the Open Systems Interconnection (OSI) protocol stack and includes protocols such as Ethernet VLAN (Virtual Local Area (LAN) Network) and Multiprotocol Label Switching (MPLS). The term "IP aggregation" represents the idea that Ethernet frames, including IP packets, are collected on the edge of the IPAG network and then, for network efficiency and compatibility with typical enterprise LANs, encapsulated into L2 protocol data units and then routed via the L2 packet switches, which do not rely on IP (OSI Layer-3) addressing to route the encapsulated packets within the IPAG network. For example, VPWS (Virtual Pseudo Wire Service) may be used for point-to-point connections and VPLE for multipoint services. IPAG switches are typically connected to a MPLS backbone network. While this embodiment concentrates on metropolitan networks, IPAG network covers a variety of other networks referred to in the telecommunications literature, such as Metropolitan Ethernet Network, Packet-Access Network, Metropolitan Area Network (MAN), and Wide Area Network (WAN). Example services provided by the IPAG networks include enterprise Ethernet services and cellular backhaul (virtual packet connectivity between cellular basestations and their Mobile Telephone Switching Offices (MTSOs)). These packet virtual services are often provided by a protocol stack called Virtual Private LAN Service (VPLS) developed by the Internet Engineering Task Force (IETF). In turn, the backbone network devices are connected via diverse paths to an IPAG Gateway switch for connecting the IPAG network to an IP (Internet Protocol) backbone network, usually provided by an Internet Service Provider (ISP), for further routing between cities or countries. In addition and consistent with the IP aggregation concept, the IPAG Gateway will typically convert the VPLS-based protocol data units to IP-based flows or MPLS tunnels that are typical of IP backbone networks. However, note that this embodiment of the IPAG network architecture is not restricted to metropolitan area networks and, thus, can be deployed to cover inter-city networks. In such latter cases the IPAG Gateway (or multiple Gateways) could interconnect to other metropolitan IPAG networks or establish peering relationships with other IP backbone networks. The networks present a large and complex design problem. Thus there exists a need for comprehensive tools for designing networks including both access nodes and backbone nodes.

SUMMARY OF THE DISCLOSURE

The presently described IPAG network planning tool assists planners in formulating an economic deployment strategy for deploying IPAG network infrastructure. The planning tool includes two major design modules. The first design module includes access packet switch and network backbone packet switch node selection, diverse uplink routing, as well as costing and traffic allocation. The second design module designs the backbone packet switch/gateway mesh network. It includes a construction heuristic that may be combined with a local search optimization.

The presently described tool provides a detailed deployment solution, on a year by year or multi-year deployment of access packet switches (e.g., Ethernet L2 aggregation switches or EMUX sub-aggregation switches) and core backbone switches. The IPAG architecture drives the aggregation capabilities closer to the customer, thus reducing fiber costs and using lower-cost Ethernet optics. The solution output by the presently described tool provides planners with a road map for near term and long term deployments, and provides a mapping for "Ethernet" capable SWC (Serving Wire Centers), that guides Sales/Marketing to where the network has Ethernet connection capabilities. The tool also allows the planner to perform "sensitivity" analysis studies to determine the robustness of the IPAG network design. Because the presently described planning tool is much faster than previously used tools, it allows for a more efficient and more flexible design process.

In accordance with a first aspect of the disclosure, a method is provided for determining a configuration of an aggregation network, the aggregation network including access packet switches and network backbone packet switches. Input data regarding the IP aggregation network is received, including customer locations, network facility locations and fiber paths. In a computer processor, a subset of the network facility locations to be access packet switch locations is selected, whereby a total fiber path length from the access packet switch locations to the customer locations is minimized.

In the computer processor, a subset of the network facility locations to be network backbone packet switch locations is selected. That selecting includes: creating a set of virtual nodes, each virtual node comprising a pair of network facility locations within a transmission range limitation of each other, and each network facility location of each pair having at least fiber degree 3; calculating, for each combination of a candidate access packet switch location and a candidate virtual node, diverse paths from the candidate access packet switch location to each of the two network facility locations of the candidate virtual node; calculating, for each combination of a candidate access packet switch location and a candidate virtual node, a fiber cost of the diverse paths; and applying a k-means clustering algorithm wherein k is a number of virtual nodes, to select a subset of the set of virtual nodes yielding a minimum total cost including fiber cost and network backbone packet switch cost.

Another aspect of the disclosure is a method for determining a link topology for linking backbone packet switches in a physical backbone network, the physical backbone network including fiber paths interconnecting the backbone packet switches and being subject to a packet switch to packet switch traffic matrix. In a computer processor, an incumbent network topology is determined by identifying fiber paths of the physical backbone network, over which links connecting backbone packet switches are routed. In the incumbent network topology, at least two links are incident to each backbone packet switch, and no removal of one backbone packet switch disconnects another backbone packet switch.

A cost of the incumbent network topology is evaluated with links sized to handle all failure conditions of the incumbent network topology An indexed list of potential express links is created, each potential express link in the list being indexed according to a computed traffic volume carried by a potential express link under normal traffic conditions when the potential express link is added to the incumbent network topology;

A candidate network topology is created by adding to the incumbent network topology an unused potential express link having a highest computed traffic volume of the indexed list of potential express links.

One or more links of the candidate network topology may be rerouted to a different fiber path of the physical backbone network to more evenly distribute circuits carried by the fiber paths.

In a computer processor, a cost of the candidate network topology is evaluated with links sized to handle all failure conditions, and the incumbent network topology is set equal to the candidate network topology if the cost of the candidate network topology is lower than the cost of the incumbent network topology. Creating a candidate network topology, possibly rerouting one or more links and evaluating a cost of the candidate network topology are repeated until all potential express links in the indexed list are used.

A local search procedure may then be employed. In this procedure, an incumbent network topology is compared to various candidate topologies that result from making a slight modification to the incumbent. The cost of a candidate topology is evaluated with links sized to handle all failure conditions and the incumbent network topology is set equal to the candidate network topology if the cost of the candidate network topology is lower than the cost of the incumbent network topology.

These aspects of the disclosure and further advantages thereof will become apparent to those skilled in the art as the present disclosure is described with particular reference to the accompanying drawings.

DETAILED DESCRIPTION OF THE DISCLOSURE

Embodiments of the disclosure will be described with reference to the accompanying drawing figures wherein like numbers represent like elements throughout. Before embodiments of the disclosure are explained in detail, it is to be understood that the disclosure is not to be limited in its application to the details of the examples set forth in the following description and/or illustrated in the figures. The disclosure is capable of other embodiments and of being practiced or carried out in a variety of applications. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The methods disclosed below may be implemented by program modules that are executed by a computer. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a non-transitory computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any machine encoded medium that provides or participates in providing instructions to one or more processors. Such a medium includes but is not limited to non-transitory media, such as optical or magnetic memory disks and flash memory. Common expedients of computer-readable media are well-known in the art and need not be described in detail here.

The present specification utilizes several abbreviations and acronyms as follows:
BGP Border Gateway Protocol
CO Central Office
EMUX Ethernet Multiplexer
Gbps Gigabits per second
GE Gigabit Ethernet
EVC Ethernet Virtual Connection
IETF Internet Engineering Task Force
IP Internet Protocol
IPAG IP Aggregation
ISP Internet Service Provider
LAN Local Area Network
MAN Metropolitan Area Network
Mbps Megabits per second
MPLS-TE Multiprotocol Label Switching—Traffic Engineering
MTSO Mobile Telephone Switching Office
NTE Network Terminating Equipment
OSPF Open Shortest Path First
ROADM Reconfigurable Optical Add-Drop Multiplexer
SWC Serving Wire Center
VPLS Virtual Private LAN Service
WAN Wide Area Network The next generation of packet-based services offered by metropolitan telecommunications carriers will focus on Ethernet services, such as VPLS and point-to-point EVCs. VPLS is a set of techniques and standards developed by the IETF to enable customer LANs in different locations to be interconnected and appear as one large private LAN to the customer, even if spread across different metropolitan areas. Most large carriers prefer to deploy routers as the major nodes of their metro Ethernet networks because of the rich set of carrier-grade topology, maintenance, and routing features they offer, plus the ability to use existing MPLS infrastructure, particularly by supporting BGP-VPLS to deliver virtual private LAN service to customers. However, this discussion of the IPAG architecture does not restrict the IPAG packet switches to routers, and covers other types of packet switches; therefore the term "packet switch," as used herein, includes both Ethernet switches and routers, as well as any other device, known now or in the future, for switching packets in a network. EVCs with guaranteed bandwidth will become the packet successor for a large proportion of today's metro private-line services currently provided by time division multiplexing technologies such as Digital Cross-Connect Systems and SONET rings. For example, EVCs will be used to provide access from customers to core (wide-area) ISPs and for links (often called wireless backhaul) between 3G/4G cellular base stations and MTSOs, which are centrally placed in most major metropolitan areas and where the various voice and data applications will be provided.

Upgrading the speed and reliability of wireless backhaul is the most critical near-term driver for the deployment of metro Ethernet networks. In fact, US carriers are planning to spend many billions of dollars over the next three to five years to upgrade their base stations and deploy metro Ethernet networks. The present specification describes a methodology for IPAG design, including architecture planning, switch placement and sizing, and link placement and sizing.

Network Architecture

Because of the inherent cost and structure of large access and metropolitan networks, most carriers design metro networks in a hierarchical (e.g., "hub-and-spoke") arrangement.

Figure 1:
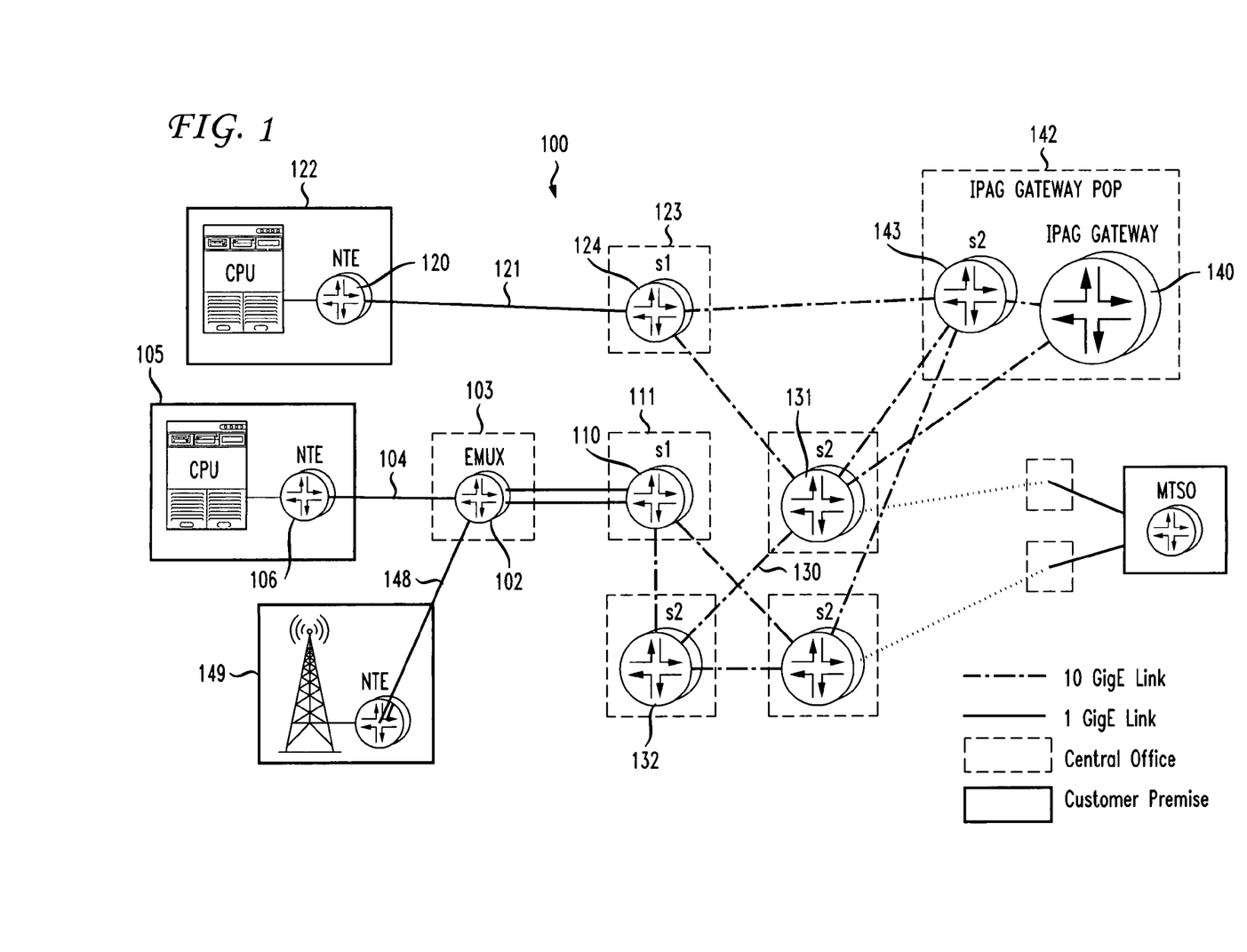
FIG. 1 is a schematic depiction of an exemplary aggregation network architecture.

In the network 100, shown schematically in FIG. 1, small packet switches (called EMUX) such as switch 102 are placed in COs such as CO 103. Customer locations such as location 105 connect to the EMUX CO 103 by access networks 104 called feeder and distribution or loop. Usually, a carrier-owned termination switch 106, generically called an NTE, is placed at the customer location and connected to the EMUX 102. Both the NTE 106 and the EMUX 102 may be Ethernet switches or layer 2 routers. Clusters of packet switches, in turn, home to a small packet switch 110, usually located in another larger CO such as CO 111. This small packet switch, which is referred to herein as an access packet switch, is enabled with VPLS and Ethernet capabilities. A cluster of access packet switches then homes to a similar, but larger packet switch, which is referred to herein as a backbone packet switch. In the present disclosure, the term "backbone packet switch" encompasses elements known as core nodes, S2 switches, core routers or IP backbone routers. The term "access packet switch" as used herein encompasses elements known as S1 switches and aggregation routers.

For reliability purposes, backbone packet switches may be grouped into pairs and each access packet switch dual-homes to a pair of backbone packet switches via Ethernet links (called uplinks). To achieve sufficient network restoration, paths of the two uplinks from a given access packet switch route over diverse fiber cables. While the access design algorithm described herein assumes that backbone switches are paired, one skilled in the art will realize that the algorithm may be adapted to the case without pairing. The backbone design algorithm works in either case, The link, such as link 104, from a customer NTE to an EMUX is typically a 1 GE link over direct fiber (or sometimes copper for lower rate connections). Also considered herein is an alternative arrangement wherein a customer NTE 120 connects directly to an access packet switch 124 (bypassing an EMUX) when less costly to do so. In this latter case, the path of the fiber is cross-connected through the serving CO 122 and then via inter-office (inter-CO) network 121 to the access packet switch CO 123. Similarly, cellular backhaul is provided to the cell site 149 by connecting directly to access packet switch 110 via interoffice network 148. The inter-office path routes over segments of direct fiber or DWDM transmission systems. Generally, in accordance with most carrier practices, two diverse paths between customer NTE and EMUX or access packet switch are not provided unless the customer purchases that extra level of reliability and the feeder network supports it. The connections between two backbone packet switches, such as the connection 130 between backbone packet switches 131, 132, are usually LOGE links. VPLS services or EVCs with a core (inter-metro) component route through a specially designated router 140 called an IPAG Gateway switch that basically acts as an access router to the IP core network. The IPAG Gateway switch 140 is co-located in a CO 142 associated with a core (inter-metro) carrier (sometimes the same company as the metro carrier) and is typically called a Point-of-Presence (POP). A backbone switch such as switch 143 may be co-located in the same CO with the IPAG Gateway switch 140. All backbone packet switches and the IPAG Gateway form a mesh (non-hierarchical) network. The mesh network must be able to reroute the traffic that is affected by any single disruption, such as a fiber, building, or switch component failure or switch or ROADM maintenance procedure, such as software upgrade or network reconfiguration.

Most large metro Ethernet carriers lease cellular backhaul links to multiple cellular carriers. Note that in a given metro, one of the metro Ethernet carriers and one of the cellular carriers might be jointly owned (wholly or partially). There are usually multiple metro Ethernet carriers as well. For simplicity, a network of a single metro carrier is treated herein; i.e., the complexity of inter-connecting multiple metro Ethernet carriers is not addressed. One skilled in the art will recognize that the presently described design tools may be extended to handle multiple metro Ethernet carriers.

The MTSO location(s) of each cellular carrier differ from one another; furthermore, they are often located in customer locations (i.e., not in COs associated with the metro carrier). To meet cellular network availability objectives, a MTSO of a cellular carrier is often homed to two different access packet switches or backbone packet switches. The inter-office paths of these links are required to be fiber/building diverse. Therefore, diversity of the feeder network to the serving COs is often required, as well.

Given customer locations, COs, a fiber topology, a ROADM topology, a demand matrix (including wireless backhaul demand) and a desired degree of network restoration from outages (or a network availability objective), the design problem is to decide where/how to:

place switches and packet switches (EMUX, access packet switches, backbone packet switches) and group backbone packet switches into pairs,
connect customers to the switches,
dual-home access packet switches to a pair of backbone packet switches, form the mesh topology of edges between backbone packet switches and the IPAG Gateway switch, and size/dimension the edges (i.e., how many 10GE links to place).

The problem just described is enormously complex and no previously existing solution to the problem has been found. To gauge the complexity and form a lower cost bound, a simple integer linear programming (ILP) model was first developed. With some simplifications and variable relaxations, AMPL ("a mathematical programming language") and CPLEX optimization software for mathematical programming, of ILOG, an IBM company, was used to run a small size metro network. However, it required a few days of computation time to get a reasonable result. To satisfy the needs of planners, a more rapid (but near-optimal) solution is preferred. Here a divide-and-conquer method is used. First, access packet switches are selected; then backbone packet switches are selected and grouped into pairs, and two disjoint paths are chosen from each access packet switch to its backbone packet switch pair. To do that, a revised minimum cost and maximum flow cost algorithm is used. Finally, the mesh backbone is optimized to connect backbone packet switches using a construction heuristic and local search algorithm. The method may be adapted to design more general network configurations, including access-only networks, backbone-only networks and non-IP networks.

Network Design Techniques

Based on scalability and performance requirements, each CO may have multiple access packet switches. Additionally, each CO may have multiple backbone packet switches. In an exemplary network, an access packet switch might support up to 360 customer 1GE links and a backbone packet switch might support up to 14 access packet switch 10GE uplinks. Due to signal transmission constraints, a maximum-allowable fiber distance may be required between any two devices, including customer to access packet switch, access packet switch to backbone packet switch, or backbone packet switch to backbone packet switch. Those constraints affect the decision of where to place access packet switches and backbone packet switches.

Access Packet Switch Node Selection

In statistics and machine learning, k-means clustering is a method of cluster analysis that aims to partition n observations into k clusters. One application of k-means clustering is described by Robert S. Cahn, "Wide Area Network Design Concepts and Tools for Optimization" (Morgan Kaufmann Publishers 1998), the contents of which is hereby incorporated herein by reference in its entirety. Specifically, given a set of observations $(x_1, x_2, \ldots, x_n)$, where each observation is a d-dimensional real vector, then k-means clustering aims to partition the n observations into k sets (k<n) $S=\{S_1, S_2, \ldots, S_k\}$, so as to minimize the total distance from each observation to its set center or "mean."

In access packet switch location (CO) selection, for a given value of k, customer locations are treated as observations $(x_1, x_2, \ldots, x_n)$. A k-means problem is then solved and the optimal set of k locations is used as the access packet switch locations. Assigning each observation to one of the k optimal locations is equivalent to connecting each customer to one access packet switch location. In so doing, the total cost of the network design segment from customers to access packet switch locations is minimized. The total cost includes the k access packet switch nodes and the total fiber cost from the customers to the access packet switches (calculated based on a given cost per mile). When k increases, the access packet switch equipment cost will increase, but the fiber cost will decrease. On the other hand, when k decreases, the access packet switch equipment cost will decrease, but the total fiber cost will increase. Thus, there is a tradeoff between total access packet switch cost and total fiber cost. In order to find the optimal value of k, a binary search is applied between 1 and n so that the total cost is minimized. This work has been done in a few seconds in experiments with real metro Ethernet network design.

Backbone Packet Switch Node Selection

A backbone packet switch can be co-located with an access packet switch, but that is not necessarily required. Backbone packet switches should be grouped into pairs and each access packet switch is then dual-homed to a backbone packet switch pair. The backbone packet switches are then interconnected with a mesh topology. Based on those requirements, each backbone packet switch location should have at least fiber degree 3 (having three different physical links to the location) to provide sufficient link diversity. Network design requirements may allow multiple backbone packet switches in a single location, or may allow only one backbone packet switch in any given location.

The backbone packet switch location selection problem can be stated as follows: select a minimum cost set of backbone packet switch location pairs such that each access packet switch is able to dual-home to a backbone packet switch pair within the fiber distance constraint. Here, the total cost includes the backbone packet switch cost plus the fiber cost of routing links from access packet switches to backbone packet switches. To solve this, a revised k-means algorithm is proposed. The revised algorithm is referred to as a dual-k-means algorithm.

For the dual-k-means algorithm, a set of virtual nodes is first created as follows. The feasible backbone packet switch locations are identified by excluding the locations where the fiber degree is smaller than 3. Any two location candidates are then combined to form a set of candidate pairs. If the fiber distance between a candidate pair is within the transmission limitation range, the pair is denoted as one virtual node. So each virtual node includes two backbone packet switch candidate locations. For each access packet switch location to each virtual node, two diverse paths are calculated from the access packet switch location to the two backbone packet switch candidate locations, and the total fiber cost is calculated. If the fiber distance from the access packet switch to one of the backbone packet switch candidate locations is larger than the transmission limitation, the total fiber cost is denoted as infinity.

For a typical demand matrix, there is a lot of local traffic that originates at a customer location, routes to an access packet switch and then to another customer location, without touching a backbone packet switch. By connecting as many access packet switches to the same backbone packet switch pairs as possible, the traffic that must be carried on the mesh network that interconnects the backbone packet switch locations can be further reduced. Thus, it is advantageous to minimize the number of backbone packet switch virtual nodes in the solution. Each backbone packet switch can accept only a certain number of access packet switches, say N, due to the uplink limitation. Thus, the number of required backbone packet switch virtual nodes is no less than |#S1|/N, where |#S1| is the total number of access packet switches placed using the above technique.

In backbone packet switch selection, the access packet switch locations are treated as observations $(x_1, x_2, \ldots, x_n)$ and the traditional k-means algorithm is applied to find k optimal virtual nodes. This is repeated for a range of k values beginning with |#S1|/N. The value of k is chosen that minimizes the total backbone packet switch equipment cost plus the fiber cost from each access packet switch to its corresponding virtual node. To avoid overloading a CO, one may require a maximum of one backbone switch per CO. Otherwise, the virtual node selection may be required to verify that no two selected virtual nodes share a common backbone packet switch candidate location. If one cluster has more than N access packet switches, it is divided into two clusters, until all selected virtual nodes have no more than N access packet switches. The selected virtual nodes determine the backbone packet switch locations, and then the access packet switches are dual-homed to a pair of backbone packet switches. This process also takes only a few seconds in experiments with real metro Ethernet networks.

Diverse Path Calculation

In backbone packet switch selection, two diverse paths must be found from each access packet switch to any virtual node, which contains two backbone packet switch candidate locations, over the given fiber graph. One could attempt a simple two-step algorithm in which one finds one shortest path first and then the second diverse path. However, such an algorithm may fail to find two diverse paths although two diverse paths exist. One could also utilize an algorithm to find two diverse paths that minimize the maximal cost of the two paths. However, this algorithm may not find the two diverse paths with overall minimal cost. The presently described network design tool applies a maxflow-mincost algorithm to find the two diverse paths. A traditional maxflow-mincost algorithm is described in R. Ahuja, T. Magnanti, and J. Orlin, "Network Flows" (Prentice-Hall 1993), the contents of which are incorporated by reference herein in their entirety.

The traditional maxflow-mincost algorithm does not provide diverse routing: it only provides flow paths from a single source to a single destination. In order to apply the maxflow-mincost algorithm to the diverse routing problem presently addressed, the fiber map topology must be modified into a directed graph as follows:

Step 1: Given an access packet switch location s, and a virtual node with two backbone packet switch candidate locations t1, t2, one extra node v is added to the directed graph and one link is added from v to the source node s with cost 0 and capacity 2. Another extra node t is added to the directed graph. One link is added from t1 to t, and one link is added from t2 to t, with cost 0 and capacity 1. That guarantees that the maxflow is at most 2.

Step 2: For any node $n_i$ in the fiber map with fiber degree greater than 3, another node $n_i'$ is added, and one link from $n_i$ to $n_i'$ is added with cost 0 and capacity 1. This step makes sure that the flow paths won't share a common node.

Step 3: For any fiber span $(n_i, n_j)$ in the fiber map: (i) if both $n_i$ and $n_j$ have fiber degree not greater than 3, one link is added from $n_i$ to $n_j$ and another link is added from $n_j$ to $n_i$; (ii) if $n_i$ has fiber degree greater than 3 but not $n_j$, one link is added from $n_j$ to $n_i$ and one link is added from $n_i'$ to $n_j$; (iii) if $n_j$ has fiber degree greater than 3 but not $n_i$, one link is added from $n_i$ to $n_j$ and one link is added from $n_j'$ to $n_i$; (iv) if both $n_i$ and $n_j$ have fiber degree greater than 3, one link is added from $n_i'$ to $n_j$ and one link is added from $n_j'$ to $n_i$. All the added links have the cost of corresponding fiber distance and capacity of 1. The step makes sure that each link has at most one flow.

Figure 2A:
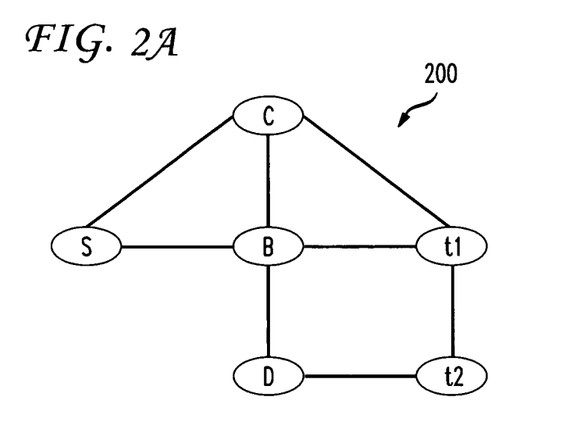
FIG. 2A is a schematic depiction of an exemplary fiber network.
Figure 2B:
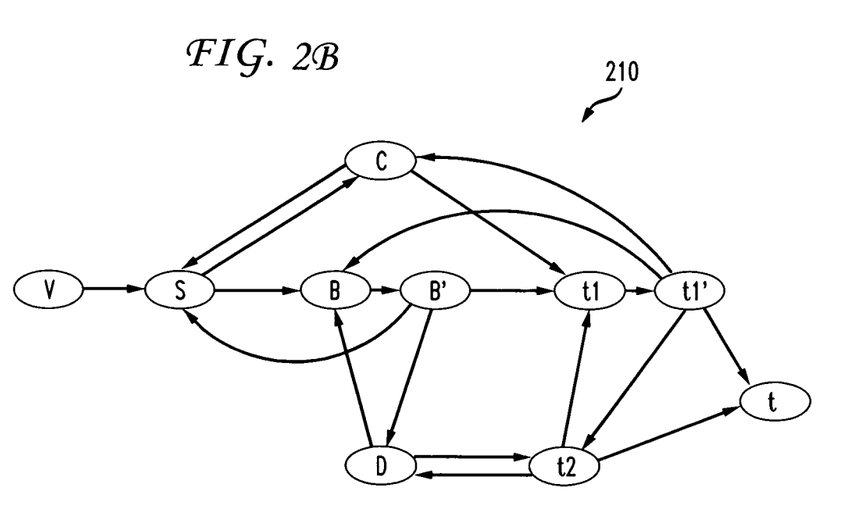
FIG. 2B is a directed graph generated from the fiber network of FIG. 2A.

Thus the diverse path problem with minimal cost between an access packet switch and one virtual node is converted to a maxflow-mincost problem between v and t, as shown in FIGS. 2A and 2B. In FIG. 2A, a partial fiber map network including 6 nodes and 7 fiber links is presented. Node s is an access packet switch location, nodes t1 and t2 are one pair of backbone packet switch locations. According to the requirements outlined above, a fiber/node disjoint path pair is required to connect node s to node t1 and to node t2. If the shortest path s-B-t1 were found as the first path, it may not be possible to find the second disjoint path from s to t2, although two diverse paths from s to t1 and s to t2 do exist. In the modified maxflow-mincost algorithm, one directed graph 210, shown in FIG. 2B, is generated from the fiber map 200 of FIG. 2A, using steps (1) (3) above. Now it is possible to find two paths from v to t: v-s-C-t1-t1'-t and v-s-B-B'-D-t2-t. Mapping back to the fiber map yields two diverse paths from s to t1 and s to t2: s-C-t1 and s-B-D-t2. A flow-augmentation based method for finding disjoint paths between node s and node t was presented in J. W. Suurballe, "Disjoint paths in a network," Network 4 (1974), p 125-145, and could also be modified to solve for disjoint paths between s and t1 and s and t2.

The Backbone Link Topology Design Problem

The mesh "backbone" network that interconnects the backbone packet switch locations must be designed for survivability in the event of a network failure such as the loss of any given fiber span or switch. If there is a particular fiber span that carries an inordinate number of mesh backbone links, a substantial amount of capacity may be required elsewhere in the network in order to assure survivability. That is because, in the event of the failure of that particular fiber span, other links in the mesh backbone would also need sufficient capacity to be able to carry that inordinate amount of traffic. Therefore, the way that the mesh backbone links are routed over the physical network significantly affects the capacity that is required. For this reason, the presently described network design tool uses a heuristic to determine the mesh backbone link topology that takes into account the backbone packet switch to backbone packet switch connections that would be carried over each physical link and the resulting impact of the various possible failure scenarios.

In the problem addressed, a given number of backbone packet switches are in place at specific locations in the network. In addition, there can be a number of access packet switches that are also in place. Each of these access packet switches is connected or "homed" to two or more of the backbone packet switches. It is assumed that the links between access packet switches and backbone packet switches, as well as the paths that they follow in the physical network, have already been determined.

It is also assumed that there is a traffic matrix that will be used for planning purposes. That matrix gives the volume, for example in Mbps, of traffic for any origin-destination pair of packet switches. Both access packet switches and backbone packet switches can be included in the traffic matrix.

Every circuit between a pair of packet switches incurs a cost. Any number of cost functions is possible. One technique is the use of a "fixed+variable cost" function. That is, there is a fixed "cost per circuit" corresponding, for example, to terminal equipment within the node, plus a variable "cost per routed mile." The fixed cost can depend on the size (i.e., capacity in Mbps) of the circuit. The fixed cost can also depend on the total length of the circuit. For example, if the total routed length of the wavelengths is greater than some threshold, the fixed cost could be higher.

For a particular link topology and a particular traffic matrix, one must route the traffic under both normal and failure scenarios. In computational experiments performed in the development of the presently described network development tool, an OSPF routing protocol was assumed, in which traffic always follows a minimum-weight path. In particular, it was assumed that the backbone links have an OSPF weight of the form $F_1+d$, where $F_1$ is a constant and d represents the distance between the packet switches. The links between access packet switches and backbone packet switches can be assigned a weight of $F_2+d$, where $F_2$ is also a constant, $F_2>F_1$. If $F_2$ is large enough, it is assured that traffic between backbone packet switches remains on the backbone and does not travel via access packet switches. One could also use other OSPF weight schemes, or else assign routes based on an MPLS-TE scheme.

The basic backbone link topology design problem can then be stated as follows. Given:

A physical network,
A set of backbone packet switches and their locations,
A set of access packet switches and their locations,
A set of links that connect the access packet switches to backbone packet switches, and their corresponding paths in the physical network,
A packet switch-to-packet switch traffic matrix,
A routing protocol,
A set of network failures for which the network must be survivable, and
A cost function for circuits, determine a minimum-cost set of links that interconnect the backbone packet switches, as well as their corresponding paths in the physical network and their required capacities.

Figure 3:
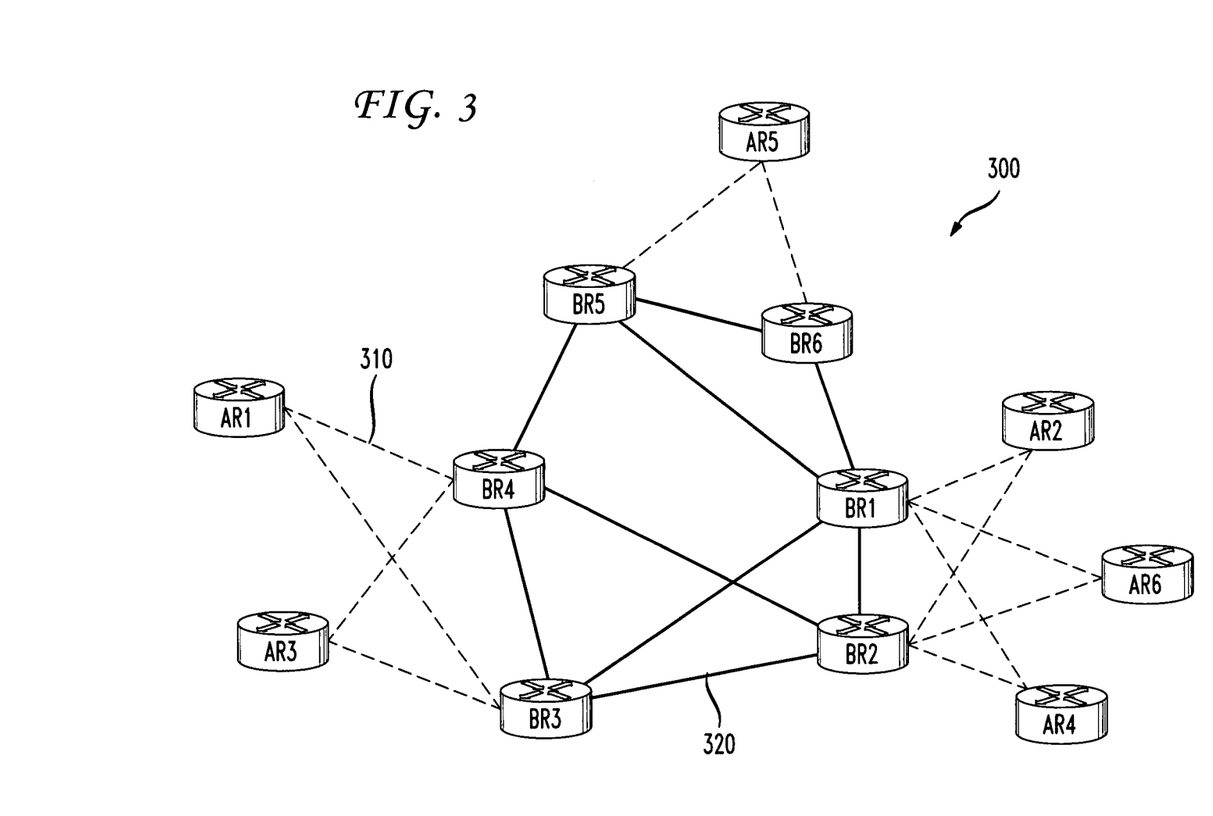
FIG. 3 is another schematic depiction of an exemplary aggregation network architecture.

An example network 300, illustrated in FIG. 3, includes six access packet switches AR1 through AR6, and six backbone packet switches BR1 through BR6. Each of the access packet switches is homed to two of the backbone packet switches. The links such as link 310 that connect each access packet switch to the backbone packet switches are denoted by light, dashed lines. The mesh backbone links such as link 320 that interconnect the backbone packet switches are denoted by heavy solid lines. It is the placement and routing of those mesh backbone links, denoted by heavy solid lines, that are determined by the heuristics described below. The network 300 of FIG. 3 shows the logical connections among the packet switches; it does not show how those logical connections might be routed over the physical network.

Heuristics for the Interconnection of Backbone Packet Switches

In this section, both a Construction Heuristic and a Local Search routine are described. There are two parts to the Construction Heuristic. Part I first creates a type of "skeleton" network, in which each packet switch is connected to packet switches that are relatively close-by and easily accessible to it via the physical network. Then, in Part II, additional "express" links are judiciously added along high-volume traffic paths in a way that attempts to minimize the impact of potential physical link failure.

In addition, the user can then apply the Local Search routine that attempts a sequence of topology changes in order to improve on the solution.

Figure 4:
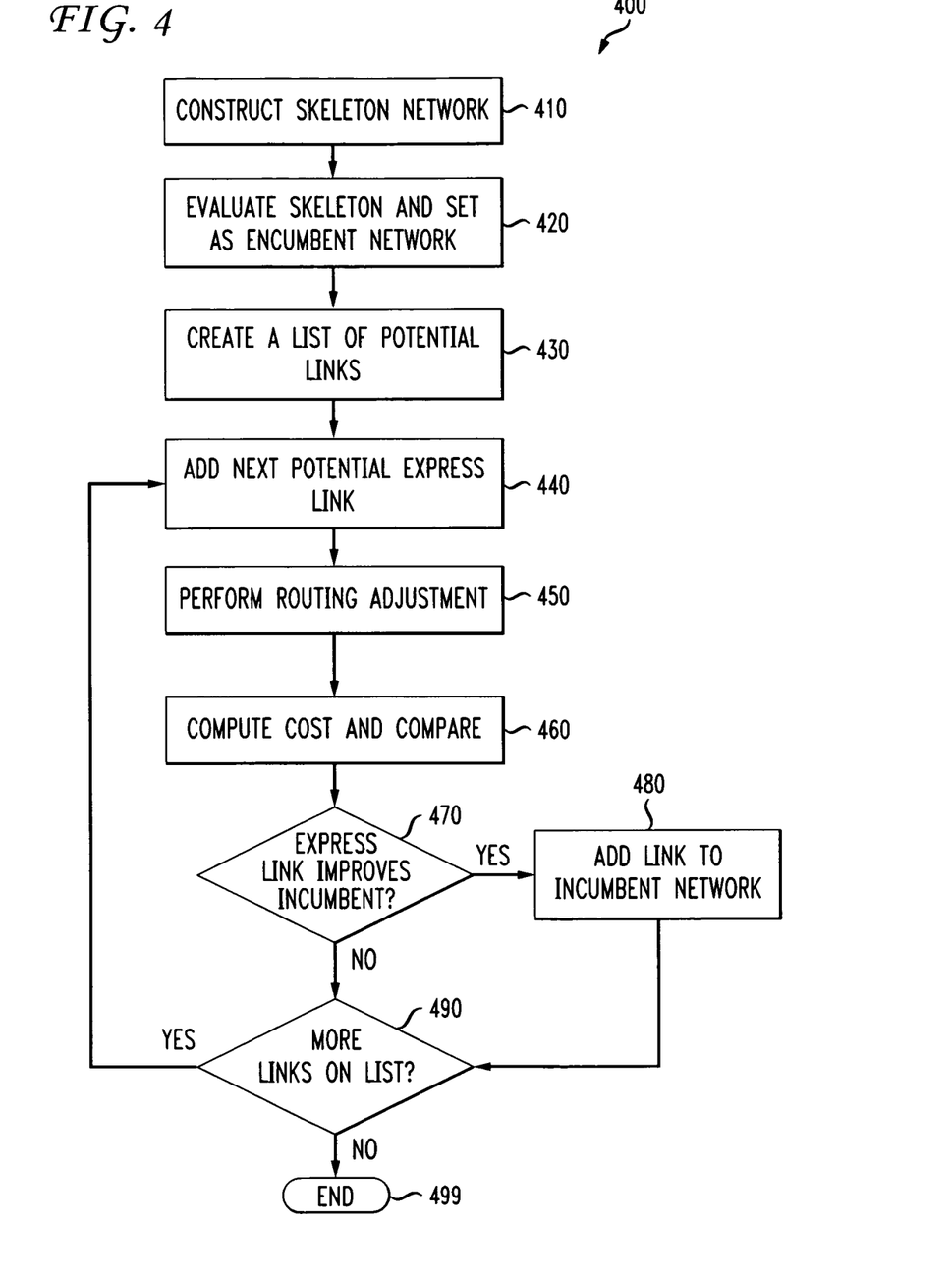
FIG. 4 is a flow chart showing a method according to one embodiment of the invention.

Part I of the Construction Heuristic, shown as block 410 of the flow chart 400 of FIG. 4, attempts to create a relatively small initial backbone network. However, in order to assure survivability, each node is required to have at least two incident links, and it is required that there be no "pinch points." A "pinch point" is a node that, if removed, would result in a disconnected network. This initial "skeleton" network is constructed as follows:

Construction Heuristic—Part I

Step 1: Include "Straight Shot" Links:

Consider each pair of backbone nodes in turn. For a given pair of backbone nodes, compute the shortest path between them through the physical network. Create a backbone link between that pair of nodes, if the corresponding shortest path does not pass through any other backbone node.

Step 2: Ensure Each Backbone Node is Incident to Two or More Links:

Examine each backbone node in turn. If, at the end of step 1, a given backbone node is incident to only one backbone link, then add a second one. Choose the second backbone link as follows. Eliminate from consideration those physical links over which the first incident backbone link is routed. This assures link diversity, so that the given backbone node is not isolated by a single failure. Using the remaining physical links, compute shortest paths between the given node and all other backbone nodes (except the one to which it is already connected). Choose the node pair corresponding to the computed path with minimum length and create a backbone link between that node pair.

Step 3: Test for "Pinch Points":

Examine each backbone node i in turn. If the network is disconnected when node i is removed, then node i is a pinch point. It is possible to test this as follows. First, assign some cost metric to each backbone link, such as its assumed OSPF weight or the total length of its route in the physical network. Then, assign an "infinite" cost to backbone links incident to node i. If there exist pairs of backbone nodes such that the shortest path between them, using backbone links, has infinite cost, then the network is disconnected when node i is removed. In that case, consider those pairs of nodes whose corresponding shortest paths have infinite cost. Add a backbone link between one of those pairs of nodes, choosing the pair whose shortest path through the physical network has minimum length. Repeat step 3 until no more pinch points are found.

Step 4: Remove "Unnecessary" Links:

Order the backbone links according to decreasing length of their routes through the physical network. Consider those links whose length is longer than some user-defined threshold and examine each one in turn. Remove a given backbone link between node i and node j if:

Each end node has more than two incident backbone links, and
There exists an alternate 2-hop path between i and j. That is, there exists another backbone node k such that there are backbone links between nodes i and k and between nodes k and j, and
Removing the backbone link between i and j would not create a pinch point.

Step 5: Evaluate Cost of the Skeleton Network:

Route traffic under normal conditions and under all possible failure conditions. Size each link based on the traffic carried under the worst possible failure and on the maximum allowed utilization. Compute the cost of the resulting network, and set the resulting network and computed cost as the incumbent network and the incumbent network cost, as shown in block 420 of FIG. 4.

In Part II of the Construction Heuristic, additional "express" links between the backbone nodes are added one at a time. Each time a candidate express link is added, how the various backbone links are routed through the physical network is adjusted in an effort to minimize the impact of any single physical link failure. That routing adjustment is shown as block 450 of the flow chart 400. Before describing Part II of the Construction Heuristic, the Routing Adjustment Procedure is described:

Routing Adjustment Procedure

Step 1: Determine Traffic Under Normal Conditions:

Consider how traffic would be routed on a candidate network under normal conditions only, and compute the resulting total bandwidth that would be required on each backbone link. Based on this, determine the total bandwidth that would be routed on each physical link. Order the physical links in decreasing order of total bandwidth.

Step 2: Adjust Routings:

Consider each physical link in turn. Let B denote the total bandwidth on the given physical link being considered. Look for alternate routes for the backbone links that it carries. One can restrict these so that the length of the alternate route is within some factor of the incumbent route. If an alternate route is found for one of the links, such that the physical links on the alternate route would carry less than B bandwidth after rerouting, then use this alternate route. If more than one rerouting is possible, choose the one that adds the least miles in the physical network. Continue until all physical links have been considered.

After performing the Routing Adjustment Procedure, the total bandwidth on each link that would be required is computed, in order for the modified network to be able to serve the given traffic matrix under all failure conditions. Based on the cost function, it is determined whether the addition of the express link results in an improvement. If so, the express link is kept and the process continues.

A step-by-step description of Part II of the Construction Heuristic is as follows:

Construction Heuristic—Part II

Step 1: Create a Set of Potential Express Links:

If there are N backbone nodes, then there are $N(N-1)/2$ possible pairs of backbone nodes; each pair corresponds to a potential express link. If a link is already included in the solution created in Part I, then delete the corresponding link from the set of potential express links. One could also, for example, choose to eliminate from consideration "unlikely" links. In one example, those links are eliminated that correspond to a pair of backbone nodes that exchange less than B mbps of traffic, where the value of the parameter B is set by the user.

Step 2: Determine Potential Traffic on Potential Express Links:

For each potential express link, do the following: Take the skeleton network created in Part I and add the potential express link to it. Then route the traffic over the resulting network under non-failure conditions. To do this requires assigning OSPF weights or applying some other routing scheme, as discussed above. Record the volume of traffic that would be carried by the potential express link (i.e., the maximum of the two one-way traffic volumes).

Step 3: Order the Best Potential Express Links:

Order the potential express links in decreasing order of the traffic volumes recorded in Step 2. This list can be truncated to include only the best candidates, i.e., the first L in the list, where L is a user parameter. In one embodiment, a value of L=25 is used. The creation of the list of potential express links described in steps 1-3 is represented by the block 430 of flow chart 400.

Step 4: Set up a New Candidate Network:

Take the next express link on the ordered list created in Step 3 and add it to those in the incumbent network to create a candidate network (block 440). Initially, assume the express link is routed on its shortest path through the physical network. Perform the Routing Adjustment Procedure (block 450) on this candidate network.

Step 5: Evaluate the New Candidate Network:

Route the traffic over the candidate network under normal conditions and under all failure conditions. Size each link based on the traffic carried under the worst possible failure and on the maximum allowed utilization. Based on this sizing, compute the cost of the candidate network (block 460). If the candidate network has less cost than the incumbent network (decision 470), make the candidate the new incumbent (block 480). If there are more potential express links left on the ordered list (decision 490), return to Step 4 (block 440). Otherwise, end the Construction Heuristic (block 499) and proceed, if desired, to the Local Search routine.

The Local Search routine considers seven methods for modifying a topology:

Drop a single link,
Rehome a link,
Add a single link,
Exchange links,
Drop a link and add a link,
Add two links, and
Swap nodes.

To drop a single link means to remove a backbone link from the incumbent network.

Figure 5:
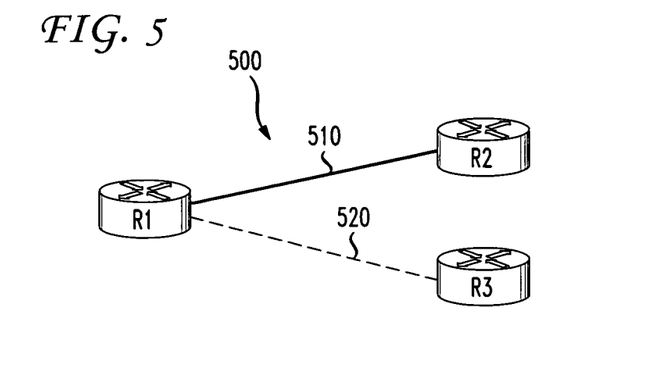
FIG. 5 is a partial schematic depiction of an aggregation network showing rehoming of a link.

Rehoming a link means to remove one link and replace it with a new link that shares one of the end nodes. As shown in the partial network 500 of FIG. 5, the solid line 510 indicates the incumbent link and the dashed line 520 indicates the rehomed link.

To add a single link means to include a new backbone link in the incumbent network.

Figure 6A:
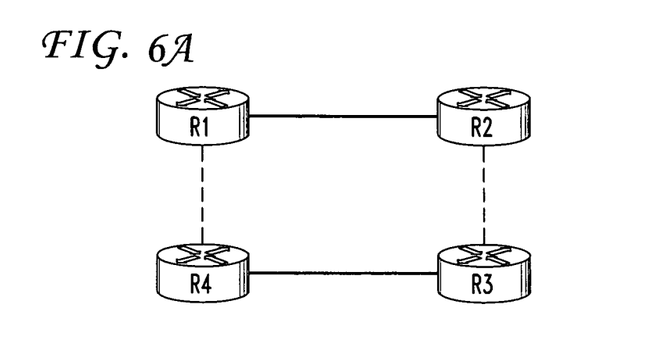
FIGS. 6A and 6B are partial schematic depictions of an aggregation network showing two possible link exchanges.
Figure 6B:
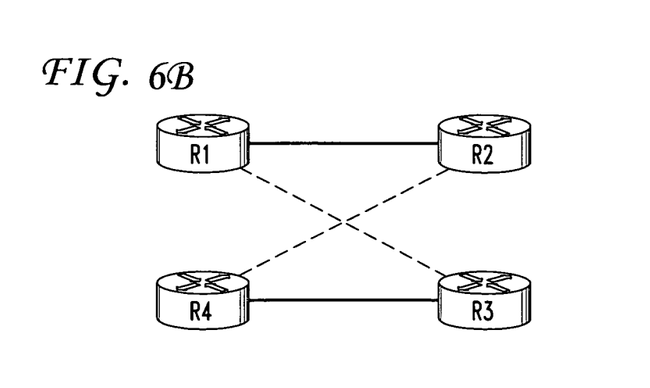

To exchange links means to select a pair of existing links, remove them, and add new links between the two pairs of nodes. FIGS. 6A and 6B illustrate two possible exchanges for a given pair of links. Once again, the solid lines indicate incumbent links and the dashed lines indicate new links.

Drop a link and add a link means to remove a backbone link from the incumbent network and simultaneously to include a new backbone link.

Add two links means to simultaneously include two new backbone links.

Figure 7:
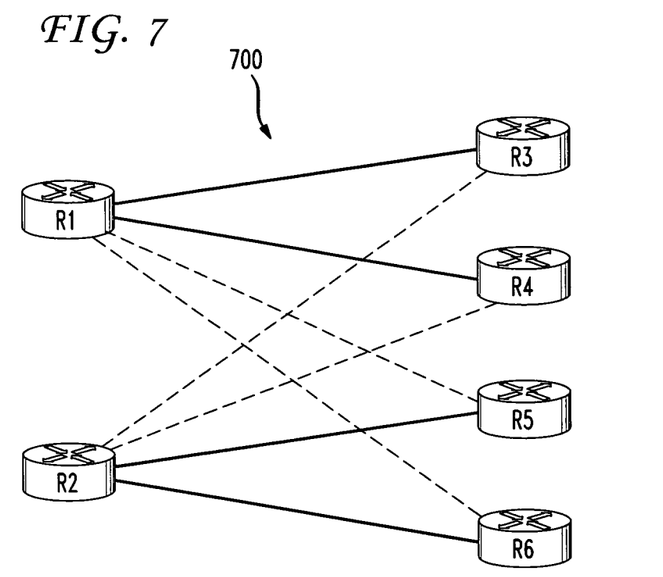
FIG. 7 is a partial schematic depiction of an aggregation network showing swapping nodes.

To swap nodes means to exchange the connectivity of a pair of nodes. The partial network 700 of FIG. 7 shows the affected links before and after a node swap involving nodes R1 and R2. As above, the solid lines indicate incumbent links and the dotted lines indicate new links.

The Local Search routine considers each type of modification in turn. If it is able to make a modification which reduces the current network cost, it accepts the change and returns to the first type of modification. The Local Search routine is described in detail as follows.

Local Search Routine

Step 1: Identify Possible Modifications for Incumbent Network

The set of all possible modifications is described above. For a given incumbent network, the specific possible modifications can be listed in order.

Step 2: Set Up the Next Possible Modification

Consider the next possible modification from the list created in Step 1. Create a candidate network with the modified set of backbone links. Assume that the new links are routed according to their shortest path in the physical network. Perform the Routing Adjustment Procedure on this candidate network.

Step 3: Evaluate the New Candidate Network

Route the traffic over the candidate network under normal conditions and under all failure conditions. Size each link based on the traffic carried under the worst possible failure and on the maximum allowed utilization. Based on this sizing, compute the cost of the candidate network. If the candidate network has less cost than the incumbent network, make the candidate the new incumbent and go to Step 1. Otherwise, if more modifications are left to try, return to Step 2. If not, STOP.

As indicated above, the types of changes considered in the local search routine are similar to those considered by the heuristic discussed in S. Lin and J. H. Rath, "Designing Networks for AT&T's Customers," AT&T Technology, Vol. 2, No. 2, pp. 18-25 (1987), the contents of which is incorporated by reference herein in its entirety. However, that heuristic does not consider the modifications of adding a single link, drop a link and add a link or add two links. That heuristic furthermore does not take into account the underlying physical network. The presently described tool takes into account the sizing required due to physical link and node failures, and introduces the Routing Adjustment Procedure.

One or more embodiments of the present invention have been described. Nevertheless, it will be understood that various modifications may be made without departing from the spirit and scope of the invention. The modifications may include implementing some steps and not others. Accordingly, other embodiments are within the scope of the following claims.

What is claimed is:

1. A method for determining a configuration of an IP aggregation network, the IP aggregation network including access packet switches and network backbone packet switches, comprising:
   receiving input data regarding the IP aggregation network, including customer locations, network facility locations and fiber paths;
   in a computer processor, selecting a subset of the network facility locations to be access packet switch locations, whereby a total fiber path length from the access packet switch locations to the customer locations is minimized;
   in the computer processor, selecting a subset of the network facility locations to be network backbone packet switch locations, including:
      creating a set of virtual nodes, each virtual node comprising a pair of network facility locations within a transmission range limitation of each other, and each network facility location of each pair having at least fiber degree 3;
      calculating, for each combination of a candidate access packet switch location and a candidate virtual node, diverse paths from the candidate access packet switch location to each of the two network facility locations of the candidate virtual node;
      calculating, for each combination of a candidate access packet switch location and a candidate virtual node, a fiber cost of the diverse paths; and
      applying a k-means clustering algorithm wherein k is a number of virtual nodes, to select a subset of the set of virtual nodes yielding a minimum total cost including fiber cost and network backbone packet switch cost.

2. The method of claim 1, wherein selecting a subset of the network facility locations to be access packet switch locations further comprises minimizing a total of a cost of access packet switches and a cost of fiber linking customer locations with access packet switches.

3. The method of claim 2, wherein minimizing a total cost comprises applying a k-means clustering algorithm.

4. The method of claim 1, wherein calculating a fiber cost of the diverse paths further comprises assigning a fiber cost of infinity for each combination having at least one diverse path exceeding a transmission limitation.

5. The method of claim 1, wherein the subset of the set of virtual nodes contains no two virtual nodes sharing a common network facility location.

6. The method of claim 1, wherein applying a k-means clustering algorithm wherein k is a number of virtual nodes further comprises:
   repeating applying a k-means clustering algorithm for a range of values of k; and
   selecting a value of k yielding the minimum total cost.

7. The method of claim 1, wherein calculating, for each combination of a candidate access packet switch location and a candidate virtual node, diverse paths from the candidate access packet switch location to each of the two network facility locations of the candidate virtual node, further comprises:
   creating a fiber map topology representation including the candidate access packet switch location, each of the two network facility locations of the candidate virtual node, the network facility locations and the fiber paths;
   modifying the fiber map topology representation to generate a directed graph permitting diverse path routing; and
   determining the diverse paths by mapping the directed graph back to the fiber map topology representation.

8. The method of claim 7, wherein modifying the fiber map topology representation to generate a directed graph permitting diverse path routing further comprises generating a directed graph between v and t by:
   adding a node v to the directed graph and adding a link with cost 0 and capacity 2 from node v to a node representing the candidate access packet switch location;
   adding a node t to the directed graph, and adding links having cost 0 and capacity 1, from the node t to nodes representing each of the pair of network facility locations of the candidate virtual node;
   for each network facility location having at least fiber degree 3, adding a node $n_i'$ to the directed graph and adding a link from the node $n_i'$ to a node representing the network facility location;
   for each fiber path connecting two network facility locations $n_i$, $n_j$ in the fiber map topology representation:
      (a) adding additional links from $n_i$ to $n_j$ and from $n_j$ to $n_i$ to the directed graph linking two network facility locations of fiber degree not greater than 3;
      (b) adding additional links from $n_j$ to $n_i$ and from $n_i'$ to $n_j$ to the directed graph wherein $n_i$ is of fiber degree greater than 3 and $n_j$ is of fiber degree not greater than 3;
      (c) adding additional links from $n_i$ to $n_j$ and from $n_j'$ to $n_i$ to the directed graph wherein $n_j$ is of fiber degree greater than 3 and $n_i$ is of fiber degree not greater than 3; and
      (d) adding additional links from $n_i'$ to $n_j$ and from $n_j'$ to $n_i$ to the directed graph linking two network facility locations of fiber degree greater than 3.

9. The method of claim 1, further comprising determining a link topology for interconnecting the backbone packet switches in a physical backbone network.

10. The method of claim 9, wherein determining a link topology for interconnecting the backbone packet switches in a physical backbone network comprises:
   determining an initial link topology by identifying links along fiber paths of the aggregation network connecting backbone packet switches, wherein at least two links are incident to each backbone packet switch, and removal of no backbone packet switch disconnects another backbone packet switch; and adding express links to the initial link topology to create the link topology, the link topology having a cost less than a cost of the link topology without the express links.

11. A non-transitory computer-usable medium having computer readable instructions stored thereon for execution by one or more processors to perform operations for determining a configuration of an IP aggregation network, the IP aggregation network including access packet switches and network backbone packet switches, the operations comprising:
receiving input data regarding the IP aggregation network, including customer locations, network facility locations and fiber paths;
selecting a subset of the network facility locations to be access packet switch locations, whereby a total fiber path length from the access packet switch locations to the customer locations is minimized;
selecting a subset of the network facility locations to be network backbone packet switch locations, including:
creating a set of virtual nodes, each virtual node comprising a pair of network facility locations within a transmission range limitation of each other and each network facility location of each pair having at least fiber degree 3;
calculating, for each combination of a candidate access packet switch location and a candidate virtual node, diverse paths from the candidate access packet switch location to each of the two network facility locations of the candidate virtual node;
calculating, for each combination of a candidate access packet switch location and a candidate virtual node, a fiber cost of the diverse paths; and
applying a k-means clustering algorithm wherein k is a number of virtual nodes, to select a subset of the set of virtual nodes yielding a minimum total cost including fiber cost and network backbone packet switch cost.

12. The non-transitory computer-usable medium of claim 11, wherein selecting a subset of the network facility locations to be access packet switch locations further comprises minimizing a total of a cost of access packet switches and a cost of fiber linking customer locations with access packet switches.

13. The non-transitory computer-usable medium of claim 12, wherein minimizing a total cost comprises applying a k-means clustering algorithm.

14. The non-transitory computer-usable medium of claim 11, wherein calculating a fiber cost of the diverse paths further comprises assigning a fiber cost of infinity for each combination having at least one diverse path exceeding a transmission limitation.

15. The non-transitory computer-usable medium of claim 11, wherein the subset of the set of virtual nodes contains no two virtual nodes sharing a common network facility location.

16. The non-transitory computer-usable medium of claim 11, wherein applying a k-means clustering algorithm wherein k is a number of virtual nodes further comprises:
repeating applying a k-means clustering algorithm for a range of values of k; and
selecting a value of k yielding the minimum total cost.

17. The non-transitory computer-usable medium of claim 11, wherein calculating, for each combination of a candidate access packet switch location and a candidate virtual node, diverse paths from the candidate access packet switch location to each of the two network facility locations of the candidate virtual node, further comprises:
creating a fiber map topology representation including the candidate access packet switch location, each of the two network facility locations of the candidate virtual node, the network facility locations and the fiber paths;
modifying the fiber map topology representation to generate a directed graph permitting diverse path routing; and
determining the diverse paths by mapping the directed graph back to the fiber map topology representation.

18. The non-transitory computer-usable medium of claim 17, wherein modifying the fiber map topology representation to generate a directed graph permitting diverse path routing further comprises generating a directed graph between v and t by:
adding a node v to the directed graph and adding a link with cost 0 and capacity 2 from node v to a node representing the candidate access packet switch location;
adding a node t to the directed graph, and adding links having cost 0 and capacity 1, from the node t to nodes representing each of the pair of network facility locations of the candidate virtual node;
for each network facility location having at least fiber degree 3, adding a node $n_i'$ to the directed graph and adding a link from the node $n_i'$ to a node representing the network facility location;
for each fiber path connecting two network facility locations $n_i$, $n_j$ in the fiber map topology representation:
(a) adding additional links from $n_i$ to $n_j$ and from $n_j$ to $n_i$ to the directed graph linking two network facility locations of fiber degree not greater than 3;
(b) adding additional links from $n_j$ to $n_i$ and from $n_i'$ to $n_j$ to the directed graph wherein $n_i$ is of fiber degree greater than 3 and $n_j$ is of fiber degree not greater than 3;
(c) adding additional links from $n_i$ to $n_j$ and from $n_j'$ to $n_i$ to the directed graph wherein $n_j$ is of fiber degree greater than 3 and $n_i$ is of fiber degree not greater than 3; and
(d) adding additional links from $n_i'$ to $n_j$ and from $n_j'$ to $n_i$ to the directed graph linking two network facility locations of fiber degree greater than 3.

19. The non-transitory computer-usable medium of claim 11, wherein the operations further comprise determining a link topology for interconnecting the backbone packet switches in a physical backbone network.

20. The non-transitory computer-usable medium of claim 19, wherein determining a link topology for interconnecting the backbone packet switches in a physical backbone network comprises:
determining an initial link topology by identifying links along fiber paths of the aggregation network connecting backbone packet switches, wherein at least two links are incident to each backbone packet switch, and removal of no backbone packet switch disconnects another backbone packet switch; and
adding express links to the initial link topology to create the link topology, the link topology having a cost less than a cost of the link topology without the express links.

* * * * *